United States Patent Office 3,433,711
Patented Mar. 18, 1969

3,433,711
PROCESS FOR TYLOSIN PRODUCTION
Paul G. Caltrider and Harold B. Hayes, Indianapolis, Ind., assignors to Eli Lilly and Company, Indianapolis, Ind., a corporation of Indiana
No Drawing. Filed June 25, 1965, Ser. No. 467,105
U.S. Cl. 195—114        6 Claims
Int. Cl. C12d 9/00; C12b 1/00

ABSTRACT OF THE DISCLOSURE

Improved process for the production of tylosin by fermentation comprising the addition to the fermentation medium of a tylosin degradation product selected from desmycosin, O-mycaminosyl tylonolide, dihydrodesmycosin, dihydro-O-mycaminosyl tylonolide, mycarose, mycaminose, and mycinose.

---

This invention relates to an improved process for the production of tylosin. More particularly, this invention relates to a process for obtaining improved yields of tylosin by adding to the fermentation medium in which the antibiotic is produced certain chemical agents which stimulate the production of the desired antibiotic.

Tylosin is a macrolide antibiotic, the properties and production of which are described in U.S. Patent No. 3,178,341. The antibiotic has become commercially important and finds extensive use in animal nutrition as a feed additive and as a therapeutic agent in the treatment of mycoplasmosis in poultry and livestock. Any process, therefore, which increases the amount of tylosin obtained during the fermentation process constitutes a valuable contribution to the art.

It is an object of this invention to provide a process whereby increased yields of tylosin can be obtained during fermentation. A further object of the invention is the provision of such a process wherein the said increased yields can be obtained without radically changing the process steps of the fermentation procedure heretofore employed. Still another object of the invention is to provide increased yields of tylosin by the addition to the fermentation medium of readily available chemical agents to stimulate tylosin production.

In accordance with these and other objects of the invention it has been discovered that certain degradation products obtained by the hydrolytic cleavage of tylosin and related antibiotics unexpectedly increase the yields of the antibiotic to a surprising degree when they are added to the fermentation medium. The mechanism whereby such added substances are effective in increasing tylosin yields is not presently known, and no theory purporting to explain the results obtained will be advanced herein. It has been found, however, that such increased yields apparently result from a true stimulation of tylosin production and not merely from the conversion of the added material into tylosin. In fact, the increased amounts of tylosin obtained are often as much as ten times greater than would result merely from a stoichiometric conversion of the added degradation product to the antibiotic.

Among the degradation products which can be obtained by the hydrolytic cleavage of tylosin are desmycosin, O-mycaminosyl tylonolide, mycarose, mycaminose, and mycinose [Tetrahedron Letters, No. 34, 2339 (1964)]. Both O-mycaminosyl tylonolide, hereinafter referred to as OMT, and desmycosin are effective antibacterial substances in their own right. Mycinose, mycarose, and mycaminose are sugar derivatives, the last named being a basic amino sugar.

All of the above-named degradation products of tylosin, when added to the fermentation medium, stimulate the production of tylosin to some degree, but desmycosin and OMT are especially preferred stimulants. The degradation products can be added in their purified form or, if desired, crude preparations can be employed with satisfactory results. The crude tylosin hydrolysate can be prepared by heating an aqueous solution of tylosin, or an acid addition salt thereof, at about pH 2, washing the reaction mixture with an immiscible organic solvent such as chloroform and the like, and concentrating to dryness the washed aqueous phase.

The corresponding degradation products obtained from dihydrotylosin, which is generally co-produced with tylosin in the tylosin fermentation, are also effective in stimulating tylosin production. These include dihydrodesmycosin and dihydro-OMT as well as the above-named sugars.

The concentration of the degradation product employed in the fermentation medium to increase tylosin yields can vary from about 25 to about 1500 mcg./ml. At levels up to about 500 mcg./mi., increased levels of the additive are reflected in proportionally increased yields of tylosin. At concentrations greater than about 500 mcg./ml., however, the increased amount of tylosin obtained is not proportionate to the amount of additive employed and, in fact, at very high levels the amount of tylosin produced is less than that produced when optimal concentrations of the additive are employed. Nevertheless, even at these high concentrations the amount of tylosin produced is greater than that obtained when no additive is employed. Optimal production of tylosin appears to occur when concentrations of the additive between about 100 and about 200 mcg./ml. are employed, and such concentrations are, therefore, preferred in the practice of the invention.

The time at which the additive is incorporated into the fermentation medium can be varied within wide limits. Thus, in general, the yields of tylosin obtained when the degradation product is added at the beginning of the fermentation are approximately equivalent to the yields resulting when the addition is made at about 20–24 hours after the initiation of fermentation. However, the maximum yields of tylosin obtained decrease when the additive is supplied as late as 48 hours post-inoculation, and still later additions produce progressively less stimulation.

The stimulation of tylosin production first becomes apparent after the fermentation has been in progress for approximately 48 hours and becomes more pronounced as the fermentation continues. When the additive is employed at or near the preferred concentration of about 100 to 200 mcg./ml., its presence in the fermentation medium can be detected for about the first 48 hours of the fermentation, but no detectable quantity remains after the fermentation has been carried on for about 72 hours or more. At concentrations above the preferred range and especially at concentrations above about 500 mcg./ml., some unchanged additive remains in the fermentation medium throughout the fermentation period.

The observed stimulation of tylosin synthesis occurs in a wide variety of fermentation media. In general, those media giving higher yields of tylosin without stimulation also respond to a greater degree to the presence of the yield-increasing additive. Thus, depending upon the fermentation medium employed, increased yields of tylosin ranging between about 10 percent and about 40 percent above nonstimulated control levels have been observed.

The addition of the degradation products appears to be equally effective in increasing tylosin production whether the fermentation is carried out in shake flasks or in stirred equipment. Moreover, the relative amounts of the tylosin species produced during the fermentation do not appear to be greatly influenced by the addition of any of the additives. Thus, for example, the ratio of tylosin to dihydrotylosin produced in a fermentation is substantially constant whether the fermentation is carried out by the process heretofore employed or whether the improved process of the present invention utilizing a production stimulant is employed.

The practice of the present invention requires practically no departure from the usual fermentation process for tylosin produced without the benefit of the yield-increasing additives. Thus, for example, the media employed in all steps of the fermentation process can be identical to those formerly employed except for the addition of the degradation product to the final production medium. Spore suspensions of the tylosin-producing organisms *Streptomyces fradiae* NRRL 2702 or NRRL 2703 are produced from agar slants as is customary in the art. The spore suspensions are then employed to produce an intermediate vegetative culture, and the vegetative culture so obtained is employed to inoculate the fermentation medium used for production of the antibiotic. If the degradation product is employed at concentrations below about 500 mcg./ml., none of the additive remains in the fermentation broth at the end of the fermentation period and, therefore, the isolation and purification of the tylosin is carried out in accordance with the procedures previously described therefor.

For the purpose of determining the effect of a particular additive upon tylosin production it is usually unnecessary to isolate the crystalline antibiotic in pure form. The course of the fermentation and the effect of the additive upon tylosin yields can readily be determined by chloroform extraction of the fermentation broth, adjusted to pH 5. The amount of tylosin present in the extract can be determined spectrophotometrically by measuring the absorbance of the chloroform extract at 283 m$\mu$ and comparing the values with those obtained with standard solutions. The results so obtained have shown excellent correlation with those obtained by actual isolation of the antibiotic.

The practice of the invention is further illustrated in the preparations and examples which follow.

PREPARATION OF OMT (A) Crude OMT preparations.—An aqueous solution of tylosin, either as the free base or as an acid addition salt, was adjusted to pH 2 by the addition of mineral acid. The resulting acidic solution was heated on a steam bath for about 100 hours, cooled, and washed with chloroform to remove colored materials. The aqueous phase was concentrated to dryness to yield a crude OMT preparation containing approximately 25 to 30 percent by weight of OMT.

(B) Purified OMT preparation.—The procedure described in paragraph A was followed through the chloroform washing step. The aqueous phase was adjusted to pH 5 by the addition of aqueous base and was again washed with chloroform to remove any descycosin which was present. The pH of the aqueous layer was further adjusted to pH 9 by the addition of base, and the basic solution was extracted with chloroform. The chloroform layer, containing the OMT, was evaporated to dryness in vacuo. Further purification of the OMT was achieved by chromatography of a chloroform solution thereof over an alumina column.

Example 1

A spore suspension of *Streptomyces fradiae* NRRL 2702 was prepared in the usual manner from a culture of the organism maintained on lima bean agar slants at 4° C. A 5-ml. portion of the spore suspension was employed to inoculate 800 ml. of a vegetative medium contained in a 2-liter Erlenmeyer flask. The vegetative medium comprised 1.5 percent cerelose, 0.5 percent corn steep solids, 0.5 percent yeast, and 0.3 percent calcium carbonate in distilled water. The inoculated vegetative medium was incubated at 28° C. for 48 hours to provide a seed medium. The latter was employed to inoculate a production medium comprising 1.75 percent fish meal, 2.0 percent beet molasses, 3.0 percent crude soybean oil, 0.2 percent calcium carbonate, 0.04 percent diammonium phosphate, and 0.1 percent sodium chloride in water. The medium was dispensed into a number of 500-ml. wide-mouth flasks, each receiving 100 ml. of the medium, and each flask was inoculated with 5 ml. of the seed medium described above. The inoculated flasks were placed on rotary shakers operating at 250 r.p.m., and fermentation was permitted to proceed at 28° C. for 138 hours.

A parallel series of flasks containing the same production medium and inoculated in the same manner were incubated under the same conditions with varying concentrations of OMT added at the time of inoculation. The effect of OMT concentration on the yield of tylosin is seen in Table I below.

TABLE I

| OMT concentration, m.c.g./ml.: | Tylosin produced, m.c.g./ml. |
|---|---|
| 0 | 4000 |
| 50 | 4665 |
| 100 | 5340 |
| 200 | 5810 |
| 300 | 6025 |
| 500 | 5985 |
| 750 | [1]6100 |
| 1000 | [1]5810 |
| 1500 | [1]5580 |

[1] Excess OMT was still present in these broths after six days' fermentations.

Example 2

The rate of tylosin synthesis in the presence and absence of OMT and the effect of varying the time of addition of OMT on the total amount of tylosin produced were determined in the following experiment.

Shake flasks containing inoculated production medium were prepared as described in Example 1. Two series of fermentations were carried out, the first containing only the inoculated production medium, the second containing inoculated production medium to which 500 m.c.g./ml. of OMT had been added. Except as otherwise indicated, the OMT was added immediately after inoculation. The flasks were harvested at daily intervals for six days in order to follow the progress of the fermentation. The yields of the tylosin are shown in Table II.

TABLE II

| Fermentation time, hours | Inoculated production medium only, mcg./ml. | Inoculated production medium plus OMT, mcg./ml. |
|---|---|---|
| 24 | 45 | 50 |
| 48 | 530 | 655 |
| 72 | 1,500 | 2,155 |
| 96 | 2,575 | 3,750 |
| 120 | 3,345 | 4,680 |
| 144 | 4,325 | 5,800 |
| 144 | 4,325 | [1]5,700 |
| 144 | 4,325 | [2]4,875 |
| 144 | 4,325 | [3]4,650 |

[1] OMT added 24 hours after inoculation.
[2] OMT added 48 hours after inoculation.
[3] OMT added 72 hours after inoculation.

Example 3

The ability of OMT to stimulate tylosin production in media of varying composition was demonstrated as follows:

The general procedure described in Example 1 was carried out except that the composition of the production medium was varied.

Medium I was the same as that employed in Example 1.
Medium II comprised 2 percent beet molasses, 2 percent yeast extract, 0.5 percent corn steep liquor, and 3 percent crude soybean oil in water.

Medium III had the following composition:

| | | |
|---|---|---|
| Dipotassium hydrogen phosphate | percent | 2.3 |
| Sodium chloride | g./l | 2 |
| Magnesium sulfate | g./l | 5 |
| Ferric ammonium citrate | g./l | 1 |
| Zinc sulfate heptahydrate | percent | 0.01 |
| Calcium carbonate | do | 3 |
| Glycide | do | 7 |
| L-Alanine | do | 2 |
| L-Valine | do | 1 |
| Betaine | do | 5 |
| Dextrose | do | 3.5 |
| Methyl oleate | do | 2.5 |

The pH of Medium III was adjusted to about pH 7.5 prior to sterilization by autoclaving.

The effect of OMT at various concentrations upon tylosin yields in each of the above-described fermentation media is shown in Table III.

TABLE III

| OMT added, mcg./ml. | Medium I | | Medium II | | Medium III | |
|---|---|---|---|---|---|---|
| | Tylosin yield,[1] mcg./ml. | Increase over control, percent | Tylosin yield,[1] mcg./ml. | Increase over control, percent | Tylosin yield,[1] mcg./ml. | Increase over control, percent |
| 0 | 4,360 | | 3,395 | | 1,870 | |
| 50 | 5,580 | 28 | 3,745 | 9 | 1,895 | |
| 100 | 5,745 | 30 | 3,830 | 13 | 2,125 | 14 |
| 200 | 6,030 | 38 | 3,770 | 9 | 2,095 | 12 |

[1] Corrected for conversion of OMT to tylosin.

Example 4

Stimulation of tylosin yields by other degradation products of tylosin was demonstrated by a procedure similar to that described in Example 1. The effect upon tylosin yield of adding the indicated degradation product is shown in Table IV.

TABLE IV

| Degradation product added | Amount added, mcg./ml. | Tylosin yield [1] |
|---|---|---|
| None | | 5,990 |
| OMT | 50 | 6,525 |
| Desmycosin | 50 | 6,630 |
| Mycinose | [2] 200 | 6,365 |

[1] Corrected for conversion of OMT to tylosin.
[2] Added at 48 hours post-inoculation.

Example 5

The ability of OMT to stimulate tylosin production in stirred equipment was demonstrated in 15-liter stainless steel reaction vessels provided with means for stirring. The equipment was sterilized at 120° C. for 30 minutes prior to charging. A three-step fermentation was employed. An incubated vegetative seed medium having the same composition as that employed in Example 1 was used to inoculate an aqueous bump stage medium comprising 0.5 percent yeast, 0.5 percent fish meal, 1 percent corn steep liquor, 0.5 percent crude soybean oil, and 0.3 percent calcium carbonate. The bump stage, in turn, was employed to inoculate the final fermentation medium employed in Example 1. The effect on tylosin yield after a 136-hour fermentation period at 28° C. is shown in Table V.

TABLE V

| OMT added, mcg./ml.: | Tylosin yield, mcg./ml. |
|---|---|
| None | 3670 |
| 50 | 4310 |
| 100 | 3930 |
| 100 [1] | 4635 |

[1] OMT added 22 hours post-inoculation.

Example 6

The effect of dihydro-OMT on tylosin yields was determined by a procedure analogous to that described in Example 1. No dihydro-OMT was detectable in the fermentation broth at the end of the fermentation. The effect upon tylosin yields is shown in Table VI.

TABLE VI

| Dihydro-OMT concentration, mcg./ml.: | Tylosin produced, mcg./ml. |
|---|---|
| 0 | 4960 |
| 25 | 5100 |
| 100 | 5410 |
| 150 | 5660 |
| 200 | 5450 |

We claim:

1. In the process for the production of tylosin by the fermentation of the tylosin-producing organism *Streptomyces fradiae* NRRL 2702 or NRRL 2703 in a nutrient medium, the improvement which comprises adding to the fermentation medium a quantity between about 50 mcg./ml. and about 1500 mcg./ml. of a tylosin degradation product selected from the class consisting of desmycosin, O-mycaminosyl tylonolide, dihydrodesmycosin, dihydro-O-mycaminosyl tylonolide, mycarose, mycinose, and mycaminose.

2. In the process for the production of tylosin by fermentation of the tylosin-producing organism *Streptomyces fradiae* NRRL 2702 or NRRL 2703 in a nutrient medium, the improvement which comprises adding to the fermentation medium a quantity between about 100 mcg./ml. and about 500 mcg./ml. of desmycosin.

3. In the process for the production of tylosin by fermentation of the tylosin-producing organism *Streptomyces fradiae* NRRL 2702 or NRRL 2703 in a nutrient medium, the improvement which comprises adding to the fermentation medium a quantity between about 100 mcg./ml. and about 500 mcg./ml. of O-mycaminosyl tylonolide.

4. The process of claim 2 wherein the desmycosin is added within about 24 hours after the initiation of the fermentation.

5. The process of claim 3 wherein the O-mycaminosyl tylonolide is added within about 24 hours after the initiation of the fermentation.

6. In the process for the production of tylosin by the fermentation of the tylosin-producing organism *Streptomyces fradiae* NRRL 2702 or NRRL 2703 in a nutrient medium, the improvement which comprises adding to the fermentation medium a quantity between about 50 mcg./ml. and about 1500 mcg./ml. of a crude tylosin hydrolysate prepared by heating an aqueous solution of tylosin at pH 2, washing the resulting mixture with an immiscible organic solvent and concentrating the aqueous phase to dryness.

References Cited

UNITED STATES PATENTS 3,178,341   4/1965   Hamill et al. _____ 195—80 X

OTHER REFERENCES

Tetrahedron Letters, No. 34, 1964, pp. 2339—2345.

MAURICE W. GREENSTEIN, *Primary Examiner.*

U.S. Cl. X.R.

195—80